US00RE44294E

(19) United States
(12) Reissued Patent
Shin et al.

(10) Patent Number: US RE44,294 E
(45) Date of Reissued Patent: Jun. 11, 2013

(54) APPARATUS AND METHOD FOR DISPLAY CONTROL IN A MOBILE COMMUNICATION TERMINAL

(75) Inventors: Eung-Seo Shin, Seoul (KR); Sung-Kyu Yoon, Seoul (KR)

(73) Assignee: Samsung Electronics Co., Ltd (KR)

(21) Appl. No.: 13/304,033

(22) Filed: Nov. 23, 2011

Related U.S. Patent Documents

Reissue of:
(64) Patent No.: 7,979,092
Issued: Jul. 12, 2011
Appl. No.: 11/803,519
Filed: May 15, 2007

(30) Foreign Application Priority Data

Jun. 13, 2006 (KR) ..... 10-2006-0052847

(51) Int. Cl.
*H04B 1/38* (2006.01)
*G09G 5/00* (2006.01)

(52) U.S. Cl.
USPC ..... 455/566; 345/173; 345/660

(58) Field of Classification Search
None
See application file for complete search history.

(56) References Cited

U.S. PATENT DOCUMENTS

| | | | | |
|---|---|---|---|---|
| 6,211,856 | B1 | 4/2001 | Choi et al. | |
| 6,288,702 | B1 * | 9/2001 | Tachibana et al. | 345/671 |
| 6,411,275 | B1 * | 6/2002 | Hedberg | 345/156 |
| 6,466,203 | B2 * | 10/2002 | Van Ee | 345/173 |
| 6,921,336 | B1 * | 7/2005 | Best | 463/32 |
| 7,213,215 | B2 * | 5/2007 | Park | 715/815 |
| 2004/0131043 | A1 * | 7/2004 | Keller | 370/351 |
| 2006/0082599 | A1 * | 4/2006 | Kameyama | 345/660 |
| 2007/0198942 | A1 * | 8/2007 | Morris | 715/767 |

FOREIGN PATENT DOCUMENTS

| | | |
|---|---|---|
| CN | 1346100 | 4/2002 |
| DE | 101 40 874 | 3/2003 |
| JP | 10269022 | 10/1998 |
| KR | 1020040057131 | 7/2004 |
| KR | 1020050039106 | 4/2005 |
| KR | 102005010298 | 10/2005 |
| KR | 1020050102982 | 10/2005 |
| WO | WO 99/32960 | 7/1999 |
| WO | WO 02/082418 | 10/2002 |

OTHER PUBLICATIONS

Norman Makoto Su et al., Rajicon: Remote PC GUI Operations Via Constricted Mobile Interfaces, Sep. 23, 2002.

* cited by examiner

*Primary Examiner* — Erika A Washington
(74) *Attorney, Agent, or Firm* — The Farrell Law Firm, P.C.

(57) ABSTRACT

Provided are an apparatus and a method for controlling an image in a mobile communication terminal. The apparatus includes a display for displaying an enlarged image; and a controller for, when an input for enlarging an image is detected, enlarging the image in a position in which the input for enlarging the image is detected, and displaying the enlarged image on the display. The apparatus controls the size of the image displayed on the display of the mobile communication terminal, allowing convenient access to data displayed on the display and the selection of menus on the enlarged image and convenience in selecting menus from a small display.

11 Claims, 7 Drawing Sheets

APPARATUS AND METHOD FOR DISPLAY CONTROL IN A MOBILE COMMUNICATION TERMINAL

Matter enclosed in heavy brackets [ ] appears in the original patent but forms no part of this reissue specification; matter printed in italics indicates the additions made by reissue.

PRIORITY

This application claims priority under 35 U.S.C. §119 to an application filed in the Korean Intellectual Property Office on Jun. 13, 2006 and assigned Serial No. 2006-52847, the contents of which are incorporated herein by reference.

BACKGROUND OF THE INVENTION

1. Field of the Invention

The present invention relates generally to an apparatus and method for controlling displaying of an image in a mobile communication terminal, and in particular, to an apparatus and method for controlling the enlarging/reducing and moving of a displayed image in a mobile communication terminal.

2. Description of the Related Art

Mobile communication terminals are indispensable items for modern consumers, regardless of gender and age, and demand for them is expected to increase. Consequently, service providers and terminal manufacturers are competitively developing new products and services to attract potential users.

For example, mobile communication terminals have phone directories, games, short message, e-mail, wake-up call alarm, Moving Pictures Experts Group (MPEG) Layer 3 (MP3), digital camera, wireless Internet, and a variety of other functions and services. Also, in addition to the above-described added capabilities, mobile communication terminals that use graphically appealing icons are increasingly being produced.

However, due to the main requirement of retaining portability, mobile communication terminals have a necessary size restriction for their displays (such as an LCD, etc.), so that the sizes of the icons outputted on the display are also restricted.

In order to solve the above problem, one scheme provides that when an icon is selected, an image is enlarged to a predetermined distance outward from the icon. However, this method enlarges the image only partially at the selected location, so that when one wishes to enlarge an image at another location, the location for the image to be enlarged must be changed and selected again. This method, however, can only be applied to mobile communication terminals with touch screen displays.

Accordingly, an apparatus and method capable of enlarging and moving a displayed image on the screen, and allowing the entire content of the image to be displayed on the screen, is required.

SUMMARY OF THE INVENTION

An object of the present invention is to substantially solve at least the above described problems and/or disadvantages and to provide at least the advantages below. Accordingly, an object of the present invention is to provide an apparatus and method for controlling a displayed image in a mobile communication terminal.

Another object of the present invention is to provide an apparatus and method for controlling an enlarged image in a mobile communication terminal.

According to an aspect of the present invention, there is provided an apparatus for controlling an image in a mobile communication terminal, including a display for displaying an enlarged image; and a controller for, when an input for enlarging an image is detected, enlarging the image in a position in which the input for enlarging the image is detected, and displaying the enlarged image on the display.

According to another aspect of the present invention, there is provided a method of controlling an image in a mobile communication terminal, including detecting an input for enlarging an image; identifying a position in which the input for enlarging the image is detected; and displaying the enlarged image in the identified position.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides an apparatus and method for adjusting the size of an image displayed in a mobile communication terminal. An input for controlling an enlarged image, as defined in the description below refers to an input for controlling an enlarged image according to a user's command. This input includes an input for moving an enlarged image, input for adjusting the size of an enlarged image by enlarging or reducing it, and an input for restoring the enlarged image. The input for controlling an enlarged image may be inputted by a user through keys or touch screen controls.

Figure 1:
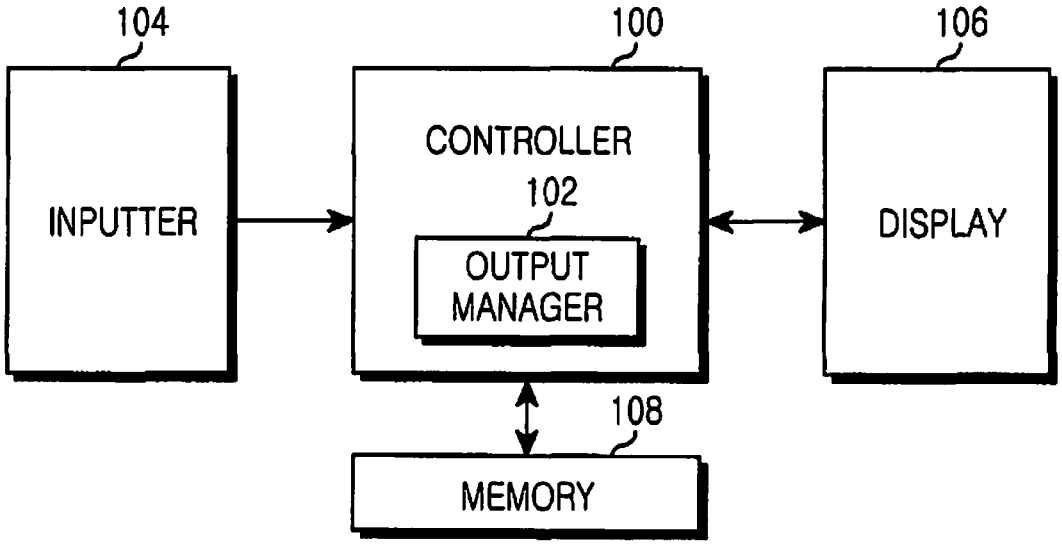
FIG. 1 is a block diagram illustrating a mobile communication terminal for controlling a displayed image according to the present invention.

FIG. 1 is a block diagram illustrating a mobile communication terminal for controlling a displayed image according to the present invention.

Referring to FIG. 1, the mobile communication terminal includes a controller 100, an input unit 104, a display 106, and a memory 108. The controller 100 includes an output manager 102.

The controller 100, or Micro-Processor Unit (MPU), controls the overall operations of the mobile communication terminal. For instance, it performs processing and controlling of audio communication and data communication. It also has an added capability of enlarging a displayed image on the mobile communication terminal to be displayed on the display 106, upon detecting a user's input for enlarging the image. Also, after the enlarged image is displayed, the controller 100 performs functions that correspond to the user's inputs (e.g., moving the enlarged image, restoring an enlarged image, changing the size of an enlarged image, etc.) through the output manager 102.

The output manager 102 is controlled by the controller 100, and controls the enlarged image displayed on the display 106. That is, it controls the moving, size adjusting, and restoring of enlarged images.

The inputter 104 has a plurality of buttons (keys) that are present on a conventional mobile communication terminal, including a key for enlarging a displayed image on the display 106, and a key for controlling the enlarged image (e.g., an image moving key, an image size adjusting key, and an image restoring key), and provides data corresponding to the user's inputs to the controller 100.

The display 106 displays status information during the operation of the mobile communication terminal, a restricted number of characters, various moving and still images, etc. The display 106 may be capable of detecting touch inputs by the user, and displays a screen according to a menu for enlarging an image according to the present invention and the input for controlling the enlarged image.

The memory 108 may include Read Only Memory (ROM), Random Access Memory (RAM), and Flash ROM, and stores programs for controlling the operation of the controller 100 or output manager 102 and data on enlargement points according to the communication terminal.

A method of adjusting the size of an enlarged image in a mobile communication terminal according to the present invention will be described below herein.

A mobile communication terminal may operate by detecting and performing key inputs or touch inputs on the display 106 made by a user for controlling a displayed image. The description below is a case where touch inputs made on the display 106 are detected and used to operate the mobile communication terminal.

Figure 2:
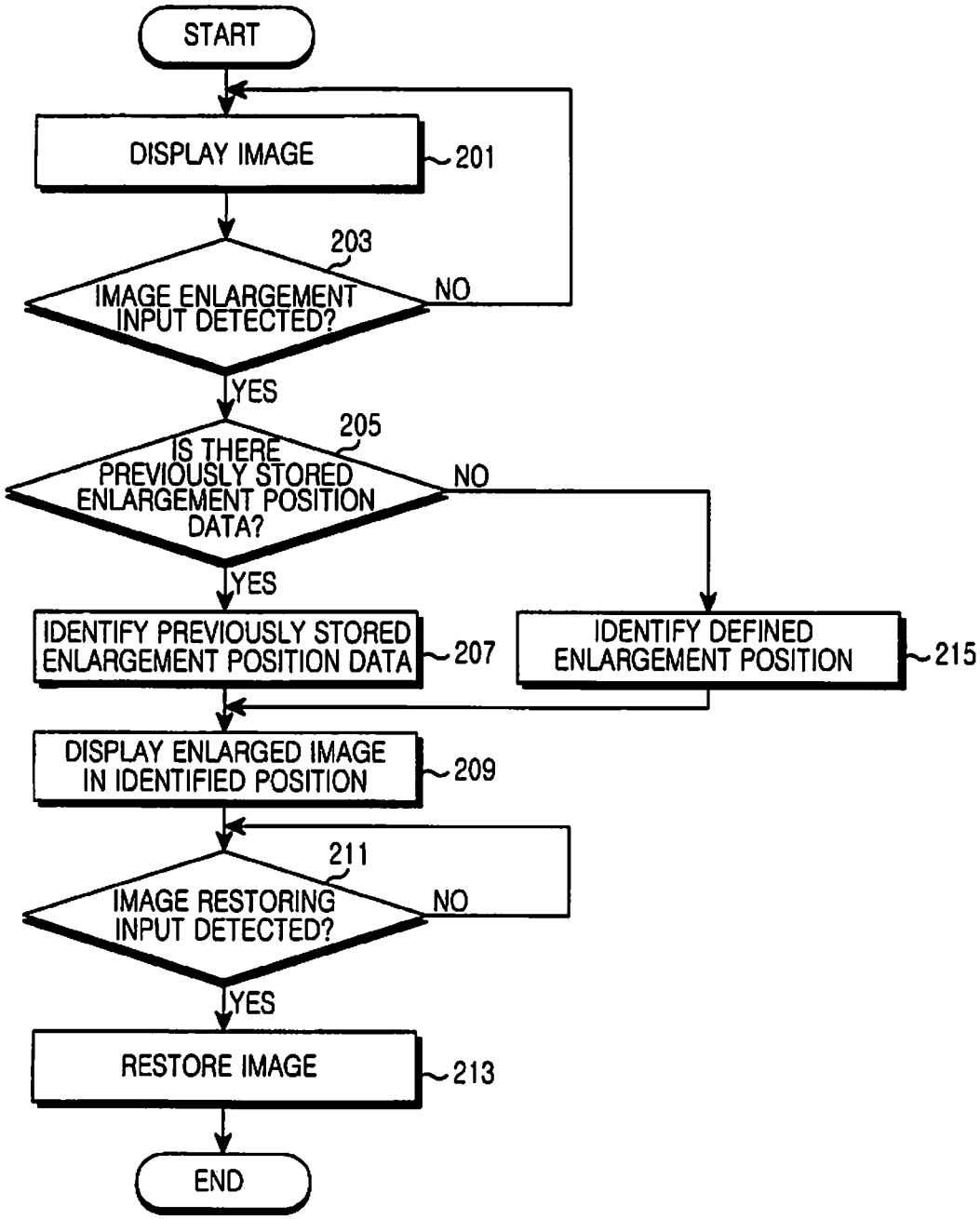
FIG. 2 is a flowchart illustrating a method for controlling a displayed image in a mobile communication terminal according to the present invention.
Figure 4A:
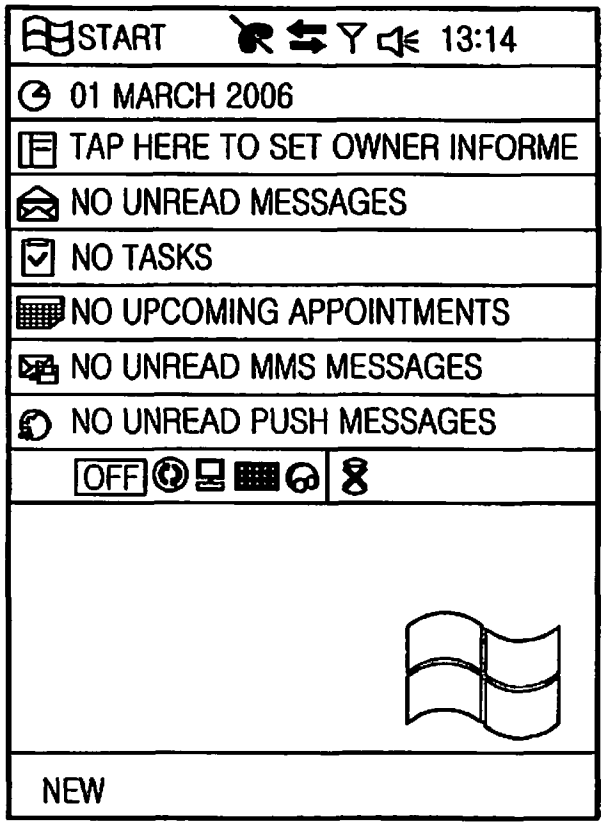
FIGS. 4A and 4B are screens illustrating a mobile communication terminal showing a controlling process of a displayed image according to the present invention.
Figure 4B:
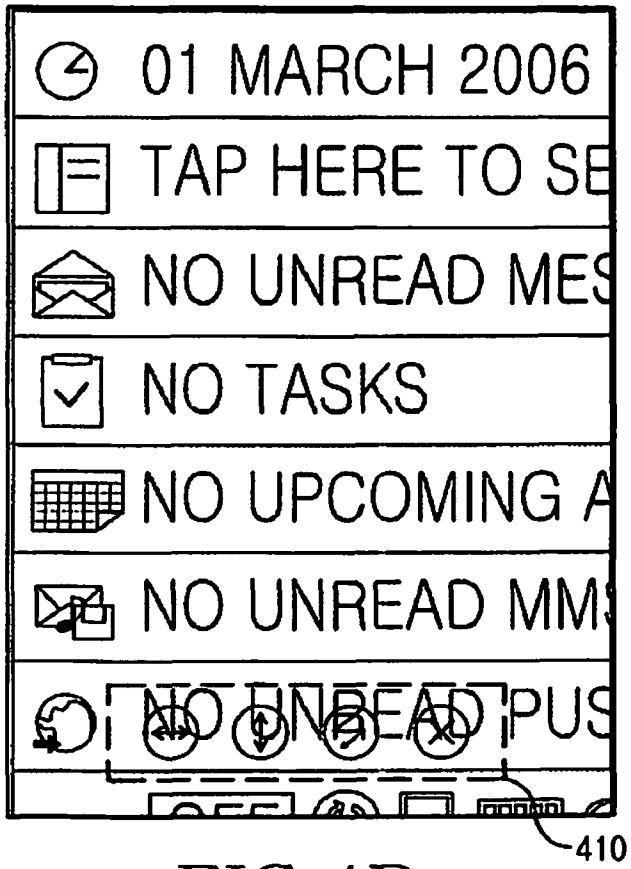

FIG. 2 is a flowchart illustrating a method for controlling a displayed image in a mobile communication terminal according to the present invention. FIGS. 4A and 4B are screens illustrating a mobile communication terminal showing a controlling process of a displayed image.

Referring to FIG. 2, the controller 100 displays a present screen of the mobile communication terminal on the display 106 in step 201 as shown in FIG. 4A. Then, the controller 100 performs step 203, in which it detects whether a user input for enlarging an image has been made. If such an input has not been detected, the controller 100 performs step 201 again.

If the controller 100 detects that a user input for enlarging an image has been made, it performs step 205, in which it checks whether there is previously stored enlargement position data in the memory 108. Here, the enlargement position data is position data derived from a previously performed image enlargement. When performing an enlargement of an image, the stored enlargement position data may be used to enlarge the image of the stored position, in accordance with a user's preference.

When the results of step 205 show that there is no previously stored enlargement position data in the memory 108, the controller 100 performs step 215, in which it first identifies a previously defined enlargement position (e.g., the upper left corner, with the current position of the cursor on the display 106 as the center), and then performs step 209 where the image of the identified position is enlarged and displayed on the display 106.

If the results from step 205 show that the enlargement position data is already stored in the memory 108, the controller 100 identifies the stored enlargement position from the memory 108 in step 207.

Next, the controller 100 displays the enlarged image in the identified enlargement position on the display 106 in step 209. Here, the enlarged image displayed on the display 106 may include a menu 410 such as that shown in FIG. 4B for controlling the moving, size adjusting, and restoring of the enlarged image.

Thereafter, in step 211 the controller 100 detects whether a user input for restoring the image has been made. Here, the input for restoring the image is an input for restoring the image to its original size before it was enlarged. An example of an input for restoring an image is when a user touches the enlarged image on the screen for longer than a predetermined duration.

If an input for restoring an image is not detected, the controller 100 performs step 211 again.

If an input for restoring an image is detected, the controller 100 performs step 213, in which it restores the enlarged image to the same size as the image that was displayed in step 201 through the output manager 102, and ends the current algorithm.

Figure 3:
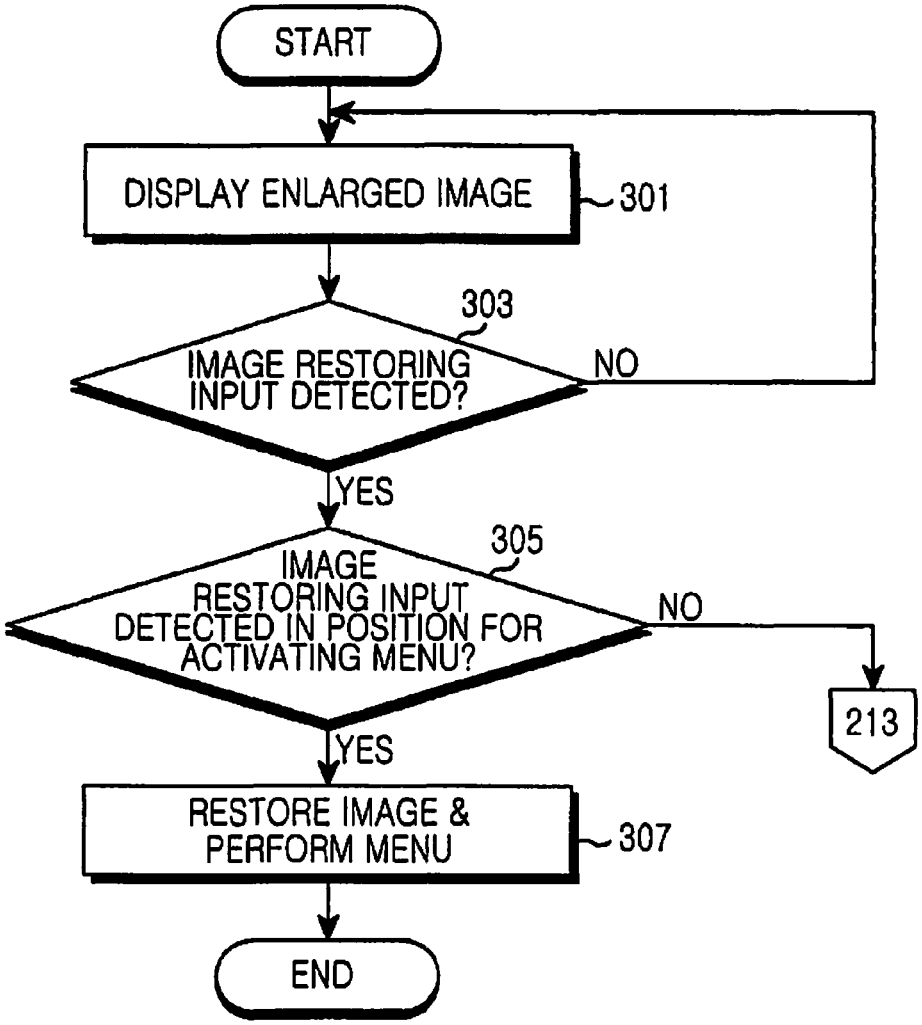
FIG. 3 is a flowchart illustrating a method for restoring an enlarged displayed image in a mobile communication terminal according to the present invention.
Figure 5B:
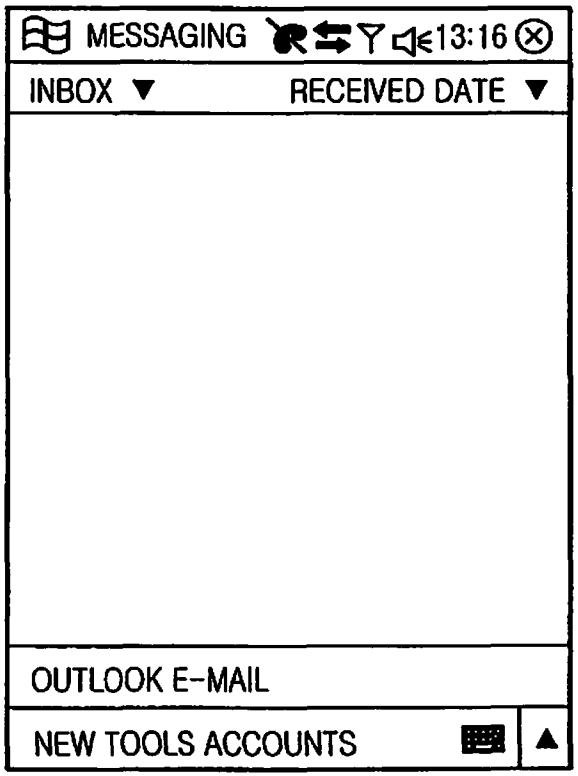
FIGS. 5A and 5B are screens illustrating a mobile communication terminal showing a controlling process of a displayed image according to the present invention.
Figure 5A:
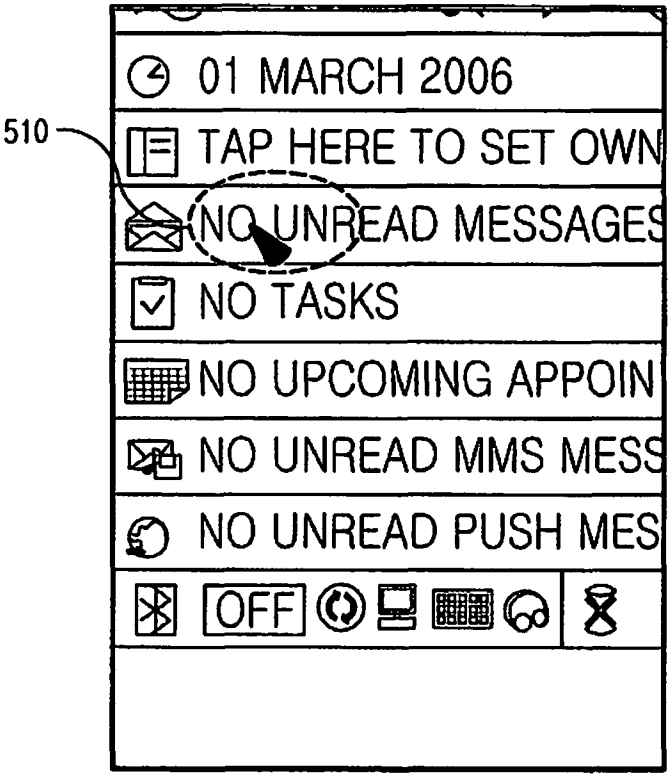

FIG. 3 is a flowchart illustrating a method for restoring an enlarged displayed image in a mobile communication terminal according to the present invention. FIGS. 5A and 5B are screens illustrating a mobile communication terminal showing a controlling process of a displayed image.

Referring to FIG. 3, the controller 100 displays an image enlarged by a user on the display 106 of the mobile communication terminal in step 301, and then performs step 303 in which it detects whether the user has made an image restoring input. Here, the image restoring input may be when a user touches the enlarged image on the screen for longer than a predetermined duration, or an input made by the user using a keypad of the mobile communication terminal.

Next, the controller 100 performs step 305 in which it detects whether the image restoring input has been made in a position for activating a menu. If the results of the detection in step 305 show that the image restoring input has not been made in a position for activating the menu, the controller 100 performs step 213 in FIG. 2, in which it restores the image to the same size as the image displayed in step 201 through the output manager 102.

If the results of the detection in step 305 show that the image restoring input has been made in a position for activating the menu, the controller 100 performs step 307 in which it activates the menu in the position where the image restoring input was made. For example, as shown in FIG. 5A, when a touch input 510 for the image restoring made over a position in a menu (e.g., over an unread message box) displayed on a mobile communication terminal is detected, the controller 100 restores the enlarged image and activates the menu (e.g., the unread message box), as shown in FIG. 5B.

Figure 6:
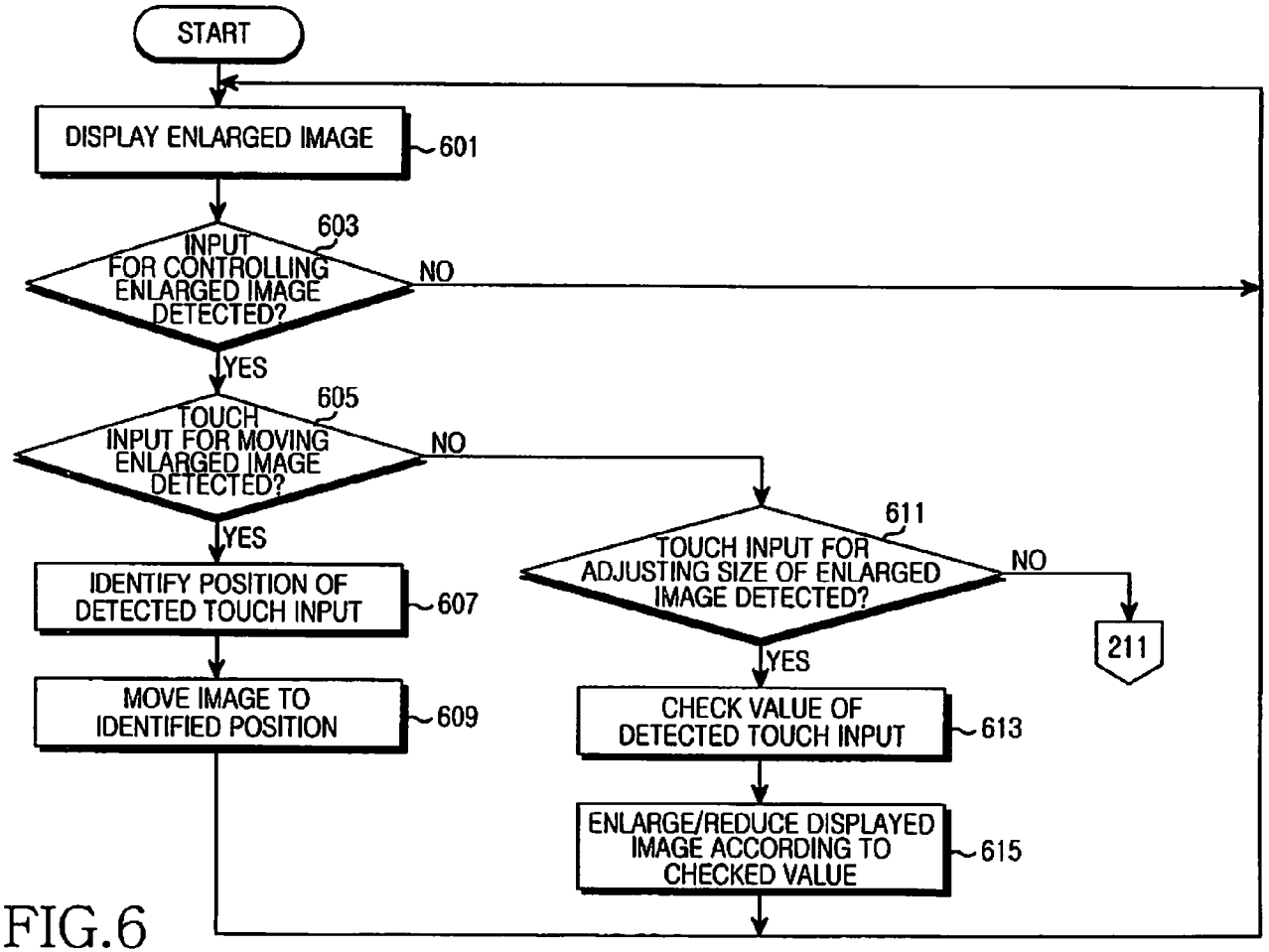
FIG. 6 is a flowchart illustrating a method of controlling an enlarged displayed image in a mobile communication terminal according to the present invention.

FIG. 6 is a flowchart illustrating a method of controlling an enlarged displayed image in a mobile communication terminal according to the present invention.

Referring to FIG. 6, the controller 100 first performs step 601 where it displays an enlarged image on the display 106. Then, in step 603, the controller 100 detects if there has been a touch input made by a user for controlling the enlarged image. Here, the touch input for controlling the enlarged image may be one of an input for moving the enlarged image, adjusting the size of the enlarged image, and restoring the enlarged image.

When the results of the detecting in step 603 show that there has been no input made, the controller 100 performs step 601 again.

When the results of the detecting in step 603 show that an input has been made, the controller 100 performs step 605, in which it determines whether the input made is the touch input for moving the enlarged image, detected in step 603. Here, the moving of the enlarged image may be a movement in an upward, downward, left, or right direction, according to the user's touch input, or a movement without restrictions (i.e., a movement in a user's dragging direction).

When an input for moving the enlarged image is detected, the controller 100 performs step 607, in which it obtains position data on the detected touch input. Then, the controller 100 moves the enlarged image to the position identified through the output manager 102 in step 609. Next, the controller 100 repeats step 601.

When the results from the detecting in step 605 show that there was no touch input for moving the enlarged image, the controller 100 performs step 611 in which it detects whether a user's touch input for adjusting the size of the enlarged image was made. If a touch input for adjusting the size of the enlarged image is not detected, the controller 100 performs step 211 in which it detects whether a touch input for restoring the enlarged image has been made (shown in FIG. 2).

When it is detected that a touch input for adjusting the size of the image has been made, the controller 100 performs step 613 in which it obtains the detected touch input value, and then performs step 615 in which it adjusts the size of the enlarged image according to the input value through the output manager 102.

Here, the detected touch input value is a value for controlling the size adjustment of the displayed enlarged image. The image displayed on the display 106 is enlarged or reduced to a predetermined size, according to the touch input.

Then, the controller 100 performs step 601 once again.

Figure 7A:
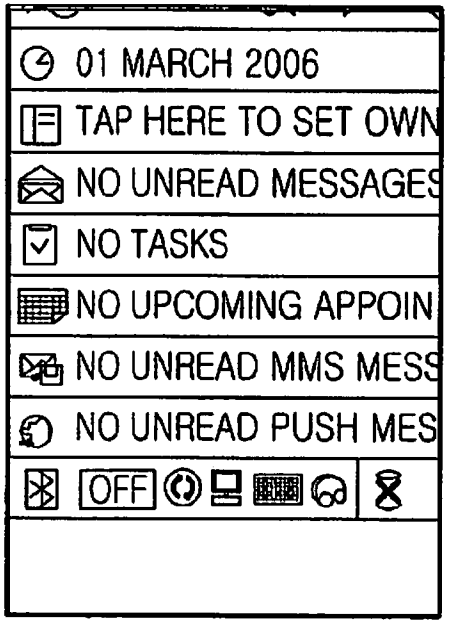
FIGS. 7A, 7B, and 7C are screen shots illustrating a mobile communication terminal showing a controlling process of an enlarged displayed image according to the present invention.
Figure 7B:
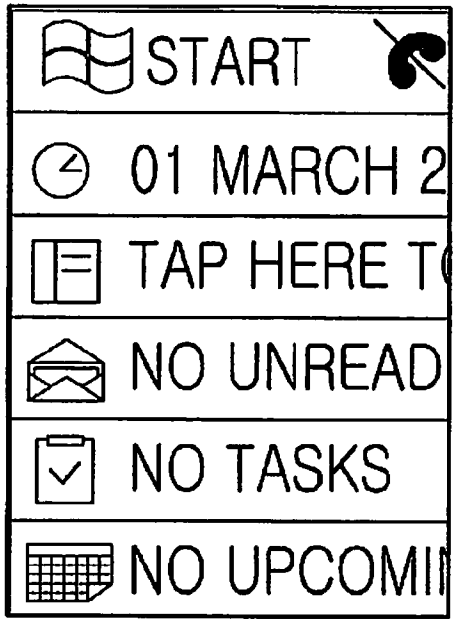
Figure 7C:
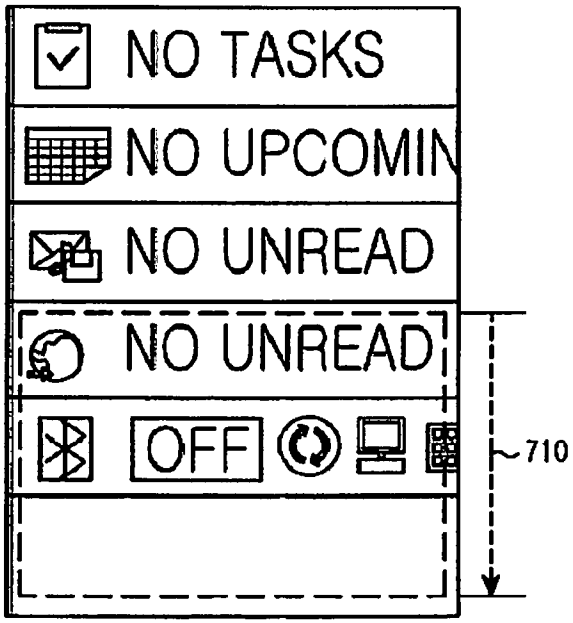

FIGS. 7A, 7B, and 7C are screen shots of a mobile communication terminal showing a controlling process of an enlarged displayed image according to the present invention.

FIG. 7A shows the screen of a mobile communication terminal displaying the enlarged image. After the enlarged image is displayed on the mobile communication terminal, when the user inputs a command to enlarge the size of the enlarged image, the mobile communication terminal displays an enlarged image, such as that shown in FIG. 7B on its display 106. Here, the size of the enlarged image may either be enlarged, as shown in FIG. 7B, or reduced in size (not shown).

Also, when an input command for moving the enlarged image (e.g., a movement to the lower portion of the screen) is detected, the mobile communication terminal moves the enlarged image in a user-inputted direction 710, as shown in FIG. 7C.

As described above, in the apparatus and method for controlling a displayed image in a mobile communication terminal according to the present invention, the size of an image displayed on the display may be adjusted to provide convenient access to the data displayed in the display of the mobile communication terminal. Also, because the selection of menus is possible in an enlarged image, the selecting of menus in a small display is made more convenient.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. An apparatus for controlling an image in a mobile communication terminal, comprising:

a display for displaying an enlarged image; and a controller for, when an input for enlarging an image is detected, enlarging the image in a position in which the input for enlarging the image is detected, and displaying the enlarged image on the display, wherein the controller controls the enlarged image by adjusting a size of the enlarged image, wherein the controller performs an operation corresponding to an input for controlling the enlarged image, when the input for controlling the enlarged image is detected after displaying the enlarged image, and wherein when an input for restoring the enlarged image is detected in a position for inputting the performing of an application program, the controller restores the enlarged image to an original size thereof, and performs the application program.

2. The apparatus of claim 1, wherein the controller includes an output manager for controlling the displayed enlarged image.

3. The apparatus of claim 1, wherein the display includes a touch screen capable of detecting touch inputs and data recognition.

4. The apparatus of claim 1, wherein controlling of the enlarged image is performed by an input through one of a keypad and a touch screen.

5. The apparatus of claim 1, further comprising a memory for storing enlargement position data that is the data of the position in which the enlargement of an image is performed.

6. The apparatus of claim 5, wherein the controller checks the enlargement position data stored in the memory, and displays the enlarged image on the display after enlarging an image of the checked enlargement position.

7. A method of controlling an image in a mobile communication terminal, comprising:

detecting an input for enlarging an image;

identifying a position in which the input for enlarging the image is detected;

displaying an enlarged image in the identified position;

controlling the enlarged image by adjusting a size of the enlarged image;

performing an operation corresponding to an input for controlling the enlarged image, when the input is detected, after the enlarged image is displayed; and restoring the enlarged image to an original size thereof, and performing an application program, when an input for restoring the enlarged image is detected in a position for inputting the performing of the application program.

8. The method of claim 7, wherein displaying an enlarged image in the identified position is performed by enlarging and displaying an image in a stored enlargement position or an image in a previously defined position according to an input of a user.

9. The method of claim 7, wherein controlling of the enlarged image is performed by an input through one of a keypad and a touch screen.

*10. A method of controlling an image in a mobile communication terminal, the method comprising:*

*detecting an input for enlarging an image;*

*identifying a position in which the input for enlarging the image is detected;*

*displaying an enlarged image in the identified position; and*

*performing an operation corresponding to an input that is received after the enlarged image is displayed,*

*wherein the operation includes restoring the enlarged image to an original size thereof, and activating an application program, when the input is detected in a position for activating the application program.*

*11. An apparatus for controlling an image in a mobile communication terminal, the apparatus comprising:*

*a display for displaying an enlarged image; and*

*a controller for, when an input for enlarging an image is detected, enlarging the image in a position in which the input for enlarging the image is detected, displaying the enlarged image on the display, and performing an operation corresponding to an input that is received after the enlarged image is displayed,*

*wherein the operation includes restoring the enlarged image to an original size thereof, and activating an application program, when the input is detected in a position for activating the application program.*

* * * * *